United States Patent
Fume et al.

(10) Patent No.: US 10,255,904 B2
(45) Date of Patent: Apr. 9, 2019

(54) READING-ALOUD INFORMATION EDITING DEVICE, READING-ALOUD INFORMATION EDITING METHOD, AND COMPUTER PROGRAM PRODUCT

(71) Applicant: Kabushiki Kaisha Toshiba, Minato-ku, Tokyo (JP)

(72) Inventors: Kosei Fume, Kawasaki Kanagawa (JP); Masahiro Morita, Yokohama Kanagawa (JP); Taira Ashikawa, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/428,701

(22) Filed: Feb. 9, 2017

(65) Prior Publication Data

US 2017/0263238 A1    Sep. 14, 2017

(30) Foreign Application Priority Data

Mar. 14, 2016   (JP) ................................. 2016-050089

(51) Int. Cl.
| | | |
|---|---|---|
| *G10L 13/04* | (2013.01) | |
| *G06F 17/27* | (2006.01) | |
| *G10L 13/10* | (2013.01) | |

(52) U.S. Cl.
CPC ........ *G10L 13/043* (2013.01); *G06F 17/2775* (2013.01); *G10L 13/10* (2013.01)

(58) Field of Classification Search
CPC .... G10L 13/043; G10L 13/10; G06F 17/2775
USPC ........................................................ 704/260
See application file for complete search history.

(56) References Cited

U.S. PATENT DOCUMENTS

| | | | | |
|---|---|---|---|---|
| 6,865,533 | B2 * | 3/2005 | Addison ................... | G09B 5/04 704/260 |
| 6,879,956 | B1 * | 4/2005 | Honda ................... | G10L 15/075 704/244 |
| 2004/0054535 | A1 * | 3/2004 | Mackie ................... | G10L 13/08 704/260 |
| 2006/0080098 | A1 * | 4/2006 | Campbell ............. | G10L 13/027 704/243 |

(Continued)

FOREIGN PATENT DOCUMENTS

| | | |
|---|---|---|
| JP | 11-052973 | 2/1999 |
| JP | 3076047 | 8/2000 |

(Continued)

*Primary Examiner* — Edwin S Leland, III
(74) *Attorney, Agent, or Firm* — Knobbe, Martens, Olson & Bear, LLP

(57) ABSTRACT

According to an embodiment, a reading-aloud information editing device includes an acquirer, an analyzer, a first generator, a second generator, and an extractor. The acquirer is configured to acquire an edit region including a text added with reading-aloud information from a document. The analyzer is configured to analyze a document structure of the edit region. The first generator is configured to generate one or more condition patterns by abstracting the edit region on the basis of the document structure. The second generator is configured to generate an extraction condition that is for extracting a text from the document and includes at least one of the condition patterns. The extractor is configured to extract a text suitable for the extraction condition from the document.

10 Claims, 8 Drawing Sheets

PATTERN (0): 1. DECREASE OF AIR RESISTANCE
PATTERN (1): 1. <NOUN PHRASE> "OF" <NOUN PHRASE>
PATTERN (2): <NUMBER> <SYMBOL> <NOUN PHRASE> + "OF" <NOUN PHRASE> +
PATTERN (3): <NUMBER> <SYMBOL> <NOUN PHRASE> + (<PREPOSITION> <NOUN PHRASE>) +
PATTERN (4): <COUNTER> <SYMBOL> <NOUN PHRASE> + (<PREPOSITION> <NOUN PHRASE>) +
PATTERN (5): <COUNTER> <SYMBOL> <*> + (<PREPOSITION> <*>) +

↓
ABSTRACTION LEVEL (HIGH)

(56) References Cited

U.S. PATENT DOCUMENTS

| | | | | |
|---|---|---|---|---|
| 2006/0129393 | A1* | 6/2006 | Oh | G10L 13/08 |
| | | | | 704/234 |
| 2011/0202345 | A1* | 8/2011 | Meyer | G10L 13/033 |
| | | | | 704/260 |
| 2012/0239390 | A1* | 9/2012 | Fume | G10L 13/10 |
| | | | | 704/220 |
| 2013/0262121 | A1* | 10/2013 | Kayama | G10L 13/04 |
| | | | | 704/267 |
| 2014/0025382 | A1* | 1/2014 | Chen | G10L 13/02 |
| | | | | 704/260 |
| 2014/0365217 | A1* | 12/2014 | Fume | G06F 17/2755 |
| | | | | 704/235 |
| 2017/0004822 | A1 | 1/2017 | Fume et al. | |
| 2017/0132464 | A1* | 5/2017 | Brown | G06K 9/00442 |
| 2017/0140749 | A1* | 5/2017 | Ashikawa | G10L 13/10 |
| 2017/0315986 | A1* | 11/2017 | Akbik | G06F 17/2785 |
| 2018/0300311 | A1* | 10/2018 | Krishnamurthy | G06F 17/274 |

FOREIGN PATENT DOCUMENTS

| | | |
|---|---|---|
| JP | 2005-516262 | 6/2005 |
| JP | 4551066 | 9/2010 |
| JP | 2012-198277 | 10/2012 |
| JP | 2014-240884 | 1/2014 |
| JP | 2014-056235 | 3/2014 |
| WO | WO 2015/162737 A1 | 10/2015 |

* cited by examiner

RESULT OF MORPHOLOGICAL
ANALYSIS:
<NUMBER> <SYMBOL> <NOUN PHRASE>
(OF) <PREPOSITION> <NOUN PHRASE>

ABSTRACTION LEVEL (HIGH)

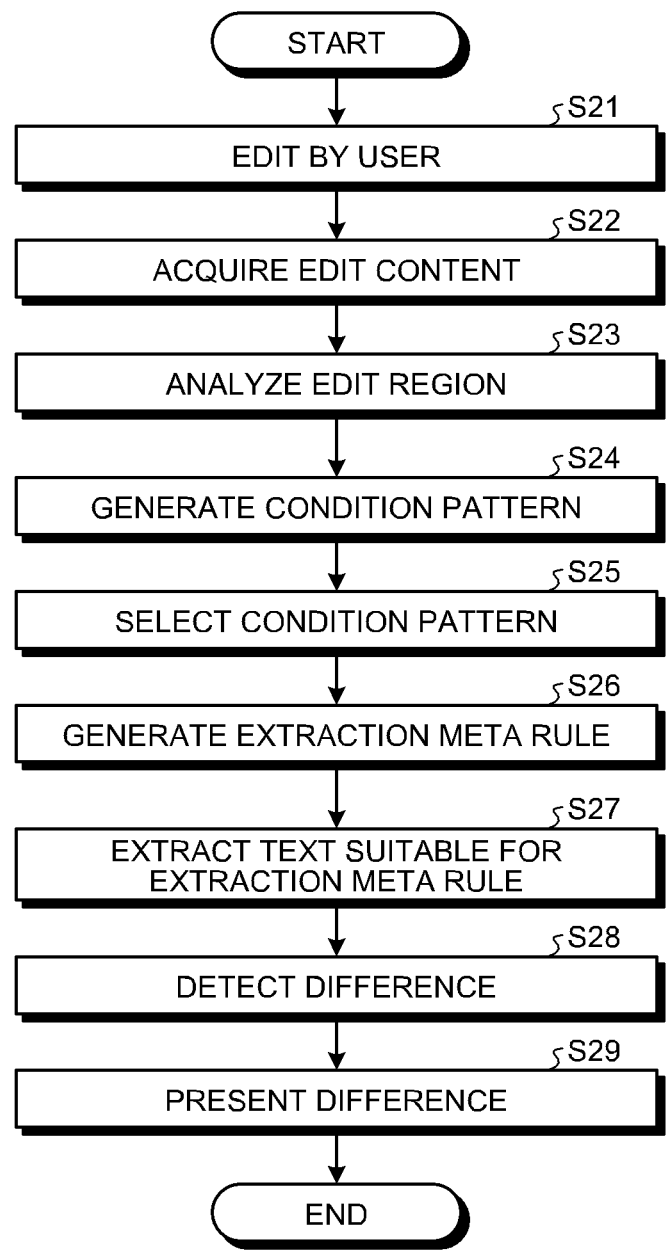

READING-ALOUD INFORMATION EDITING DEVICE, READING-ALOUD INFORMATION EDITING METHOD, AND COMPUTER PROGRAM PRODUCT

CROSS-REFERENCE TO RELATED APPLICATION

This application is based upon and claims the benefit of priority from Japanese Patent Application No. 2016-050089, filed on Mar. 14, 2016; the entire contents of which are incorporated herein by reference.

FIELD

The embodiment of the present embodiment relates to a reading-aloud information editing device, a reading-aloud information editing method, and a computer program product.

BACKGROUND

In recent years, with the improvement of sound quality and speaker's individuality, a speech synthesis technology has been used in many fields including narration in public facilities and public transportation, interface in entertainment or interaction with the system, or the like. In addition, automation of read-aloud speech of texts of e-books and the like has been attempted.

In general, in various documents, there are unique phrases, expressions, notations, and the like of new words, unknown words, proper nouns, and the like. It is difficult to automatically and correctly estimate reading and accents of an arbitrary natural sentence (sentence including Chinese characters and Japanese characters) by using the speech synthesis technology and to output the reading and accents as speech. For this reason, methods of manually modifying portions where the system cannot automatically designate the reading and accents have been frequently used. Specifically, positions where misreading and accent errors occur due to a speech synthesis function are manually designated with correct reading and accent.

As a technology supporting the speech synthesis function, has been proposed a technology for editing read-aloud speech in a short time and efficiently by providing, to the user, portions which are to be corrected according to statistics of words appearing in documents and a speech recognition result text or the like of synthesized speech with order being added. However, during the editing of the read-aloud speech, even if the read-aloud speech needs to be frequently modified or finely adjusted according to review results, since an influence range on the entire document due to the correction of the read-aloud speech cannot be recognized, there is a problem in that backtracking or oversight in correction work may occur.

BRIEF DESCRIPTION OF THE DRAWINGS

FIG. 11 is a flowchart illustrating overall operations of the reading-aloud information editing device.

DETAILED DESCRIPTION

According to an embodiment, a reading-aloud information editing device includes an acquirer, an analyzer, a first generator, a second generator, and an extractor. The acquirer is configured to acquire an edit region including a text added with reading-aloud information from a document. The analyzer is configured to analyze a document structure of the edit region. The first generator is configured to generate one or more condition patterns by abstracting the edit region on the basis of the document structure. The second generator is configured to generate an extraction condition that is for extracting a text from the document and includes at least one of the condition patterns. The extractor is configured to extract a text suitable for the extraction condition from the document.

Hereinafter, a reading-aloud information editing device, a reading-aloud information editing method, and a computer program product according to embodiments of the present embodiment will be described in detail with reference to the drawings. Since the drawings are schematic, detail configurations will be understood from the following description.

Figure 1:
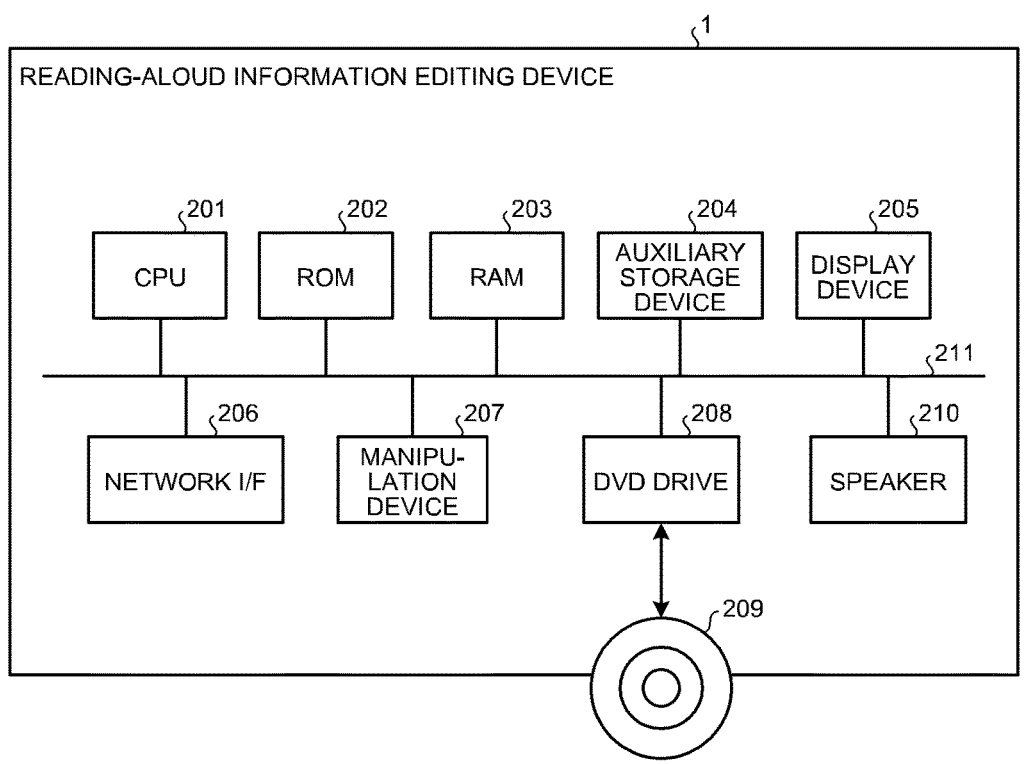
FIG. 1 is a diagram illustrating a hardware configuration of a reading-aloud information editing device.

FIG. 1 is a diagram illustrating a hardware configuration of a reading-aloud information editing device according to the embodiment. The hardware configuration of the reading-aloud information editing device 1 according to the embodiment will be described with reference to FIG. 1.

As illustrated in FIG. 1, the reading-aloud information editing device 1 is configured to include a central processing unit (CPU) 201, read only memory (ROM) 202, random access memory (RAM) 203, an auxiliary storage device 204, a display device 205, a network I/F 206, a manipulation device 207, a digital versatile disk (DVD) drive 208, and a speaker 210 (speech output device). The reading-aloud information editing device 1 may be an information processing device such as a personal computer (PC) or may be a dedicated device dedicated for speech synthesizing of a text.

The CPU 201 is a unit for controlling overall operations of the reading-aloud information editing device 1. The ROM 202 is a non-volatile device storing a basic input/output system (BIOS) or programs such as firmware executed by the CPU 201 for controlling functions. The RAM 203 is a volatile storage device used as a work area of the CPU 201.

The auxiliary storage device 204 is a non-volatile device storing various data, programs, and the like. The auxiliary storage device 204 is, for example, a hard disk drive (HDD), a solid state drive (SSD), or the like.

The display device 205 is a device displaying a screen or the like of application executed by the CPU 201. The display device 205 is, for example, a cathode ray tube (CRT) display, a liquid crystal display, an organic electroluminescence (EL) display, or the like.

The network I/F 206 is a device which is connected to an external network to communicate with an external device such as a server device. The network I/F 206 is, for example, a communication device such as a network interface card (NIC). As a communication protocol of the network I/F 206, for example, Transmission Control Protocol (TCP)/Internet Protocol (IP), User Datagram Protocol (UDP)/IP, or the like may be applied.

The manipulation device 207 is a device performing a manipulation input for a user to allow the CPU 11 to execute a predetermined process. The manipulation input is, for example, input of characters, numbers, or the like, input of manipulation of selection of various instructions, input of movement of a cursor, or the like. The manipulation device 207 is, for example, an input device such as a mouse, a keyboard, a numeric keypad, a touch pad, a touch panel.

The DVD drive 208 is a device controlling operations of data reading, writing, or the like on the DVD 209 as a detachable storage medium. In addition, as another example of the above-described detachable storage medium, there may be exemplified a computer readable or writable storage medium such as a compact disc read only memory (CD-ROM), a compact disc recordable (CD-R), a DVD-ROM, a DVD recordable (DVD-R), or a Blu-ray disc.

The speaker 210 is a device outputting speech under the control of the CPU 201.

The above-described CPU 201, ROM 202, RAM 203, auxiliary storage device 204, display device 205, network I/F 206, manipulation device 207, DVD drive 208, and speaker 210 are communicably connected to each other via a bus 211 such as an address bus and a data bus.

In addition, the hardware configuration of the reading-aloud information editing device 1 is exemplary, but the present embodiment is not limited to the configuration illustrated in FIG. 1. For example, besides the DVD drive 208, a medium drive performing control of reading or writing in flash memory or the like may be included.

Figure 2:
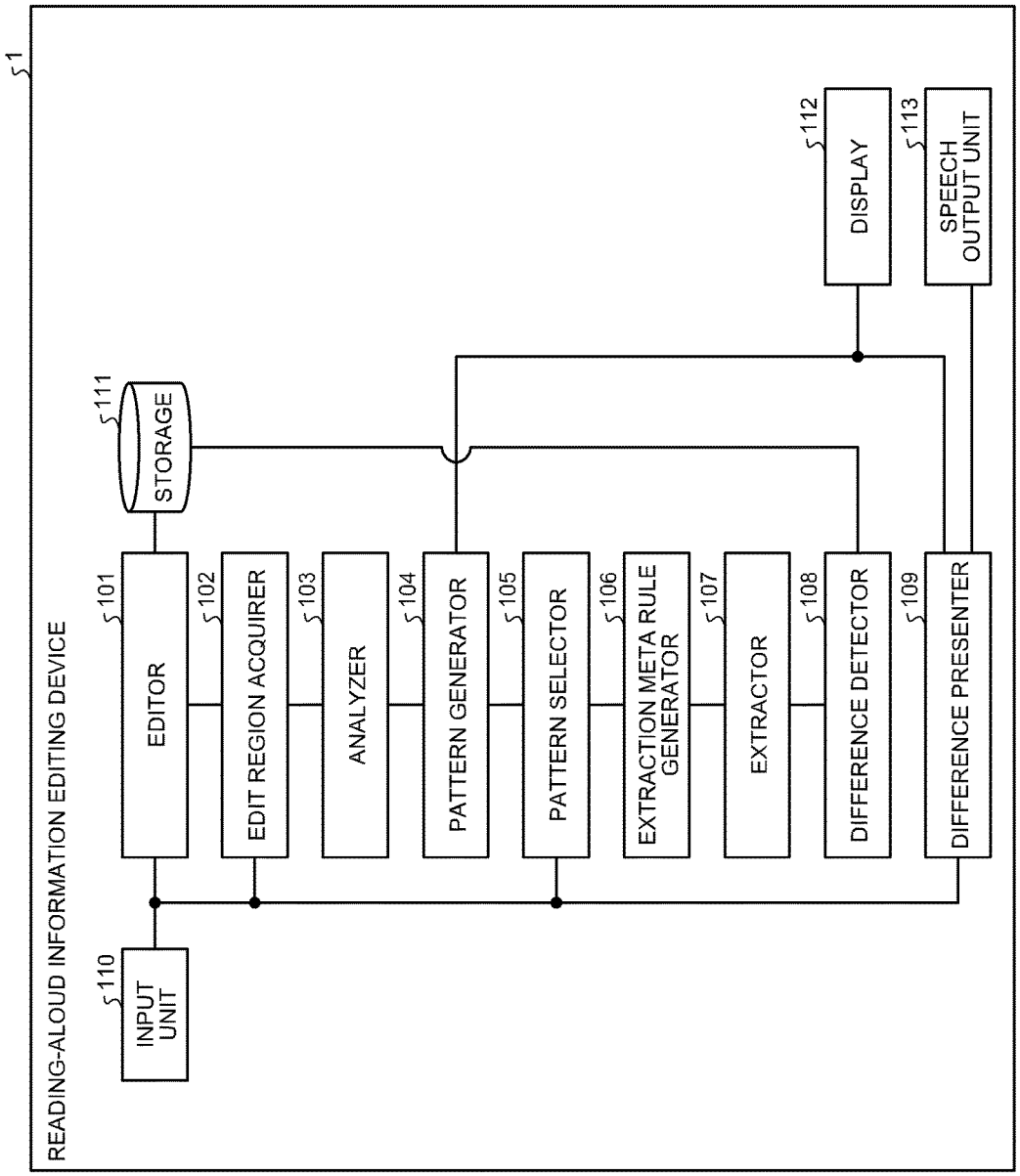
FIG. 2 is a diagram illustrating a configuration of functional blocks of the reading-aloud information editing device.
Figure 3:
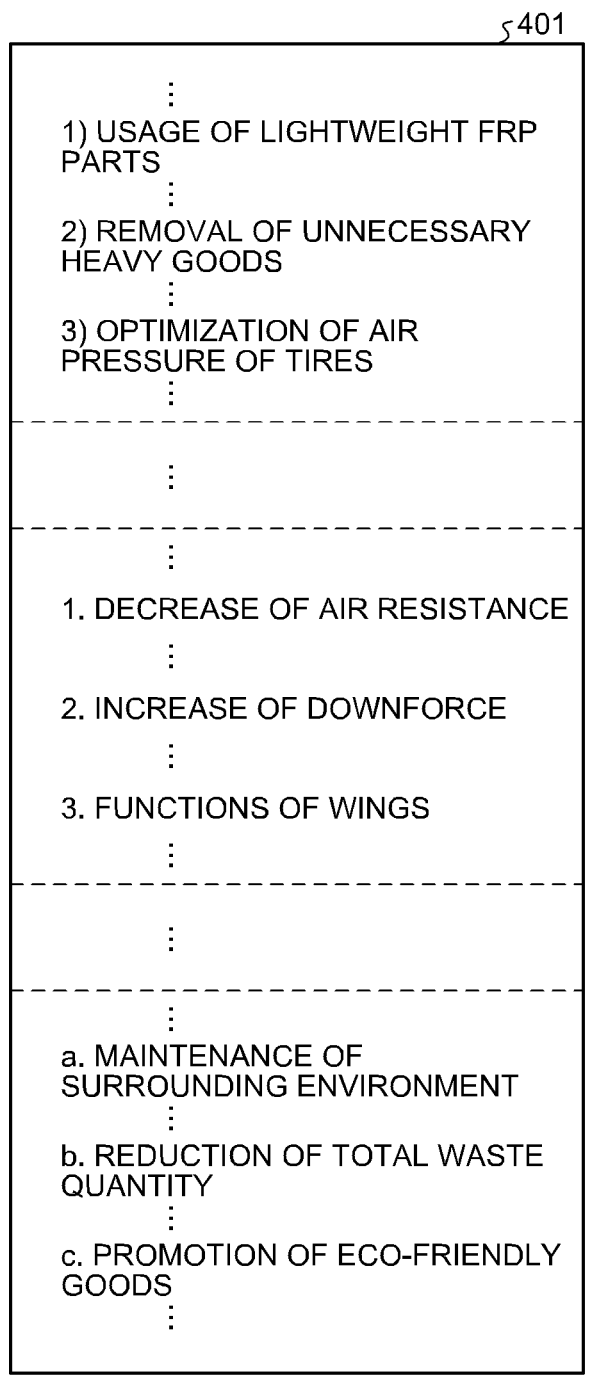
FIG. 3 is a diagram illustrating an example of an input document.
Figures 4, 5:
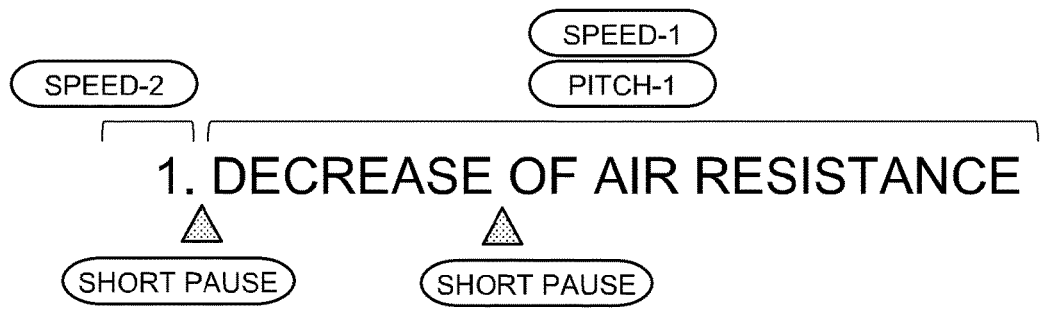
FIG. 4 is a diagram illustrating an example of an editing operation for metadata on a text.
FIG. 5 is a diagram illustrating an example of a result of morphological analysis on a text.
Figure 6:
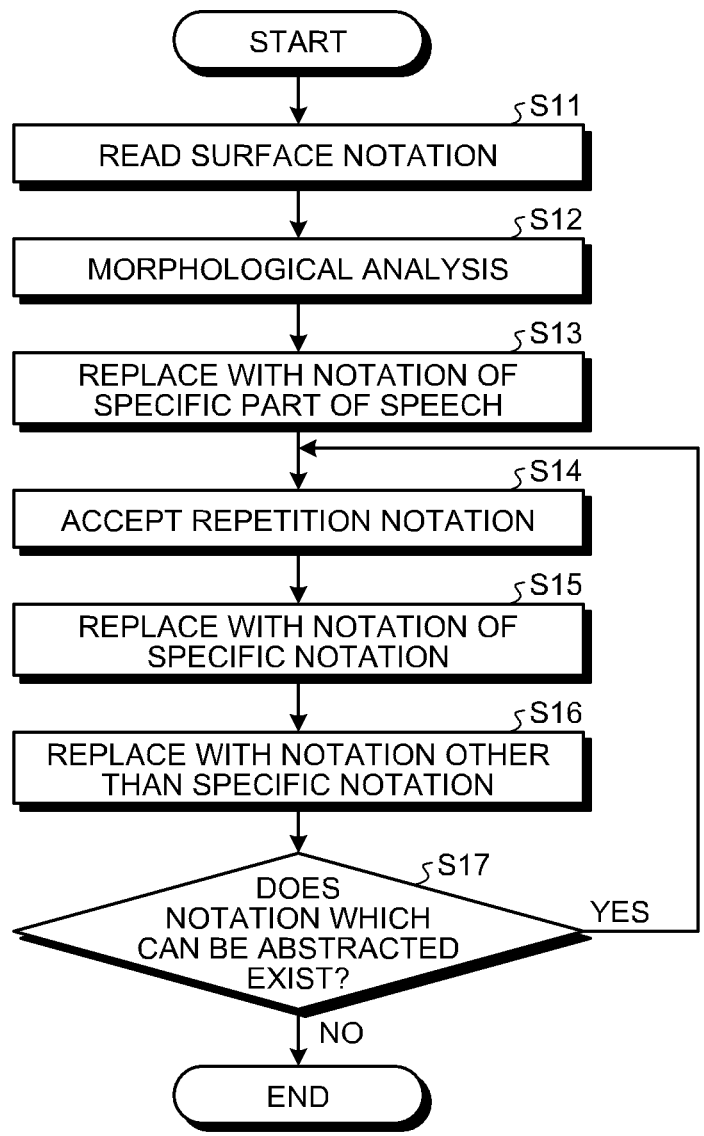
FIG. 6 is a flowchart illustrating an example of a generation process for the condition patterns.
Figure 7:
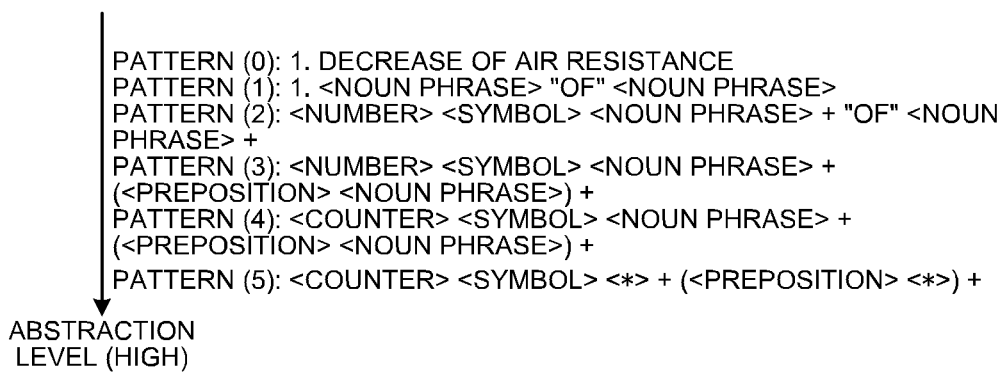
FIG. 7 is a diagram illustrating an example of a condition pattern generated according to an abstraction level.
Figures 8A, 8B:
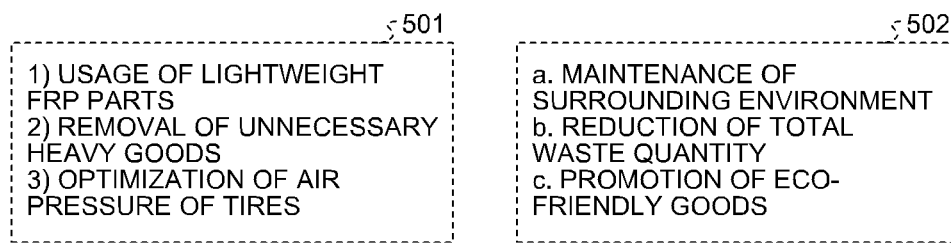
FIGS. 8A and 8B are diagrams illustrating an example of a result of extraction of a text suitable for a specific condition pattern.
Figure 9:
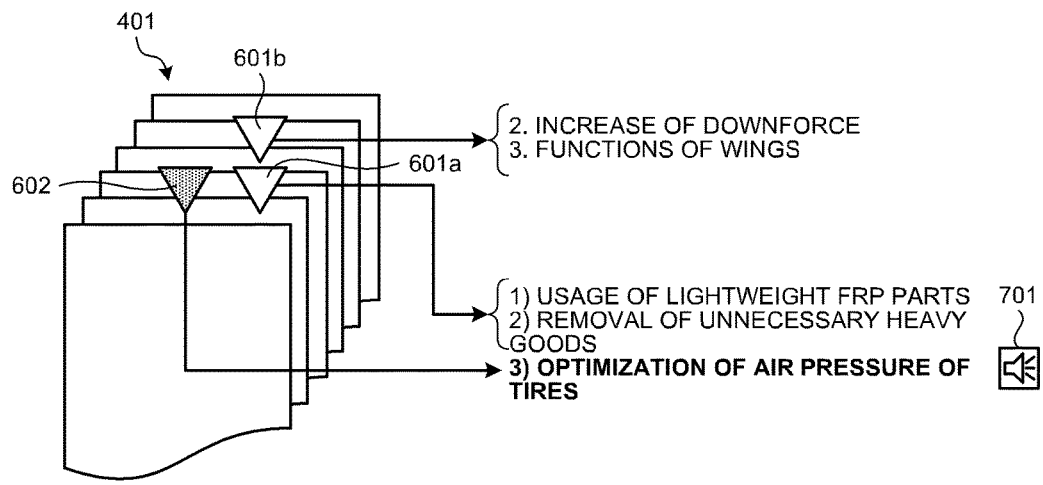
FIG. 9 is a diagram illustrating an example of presentation of a difference with respect to an extracted text.
Figure 10:
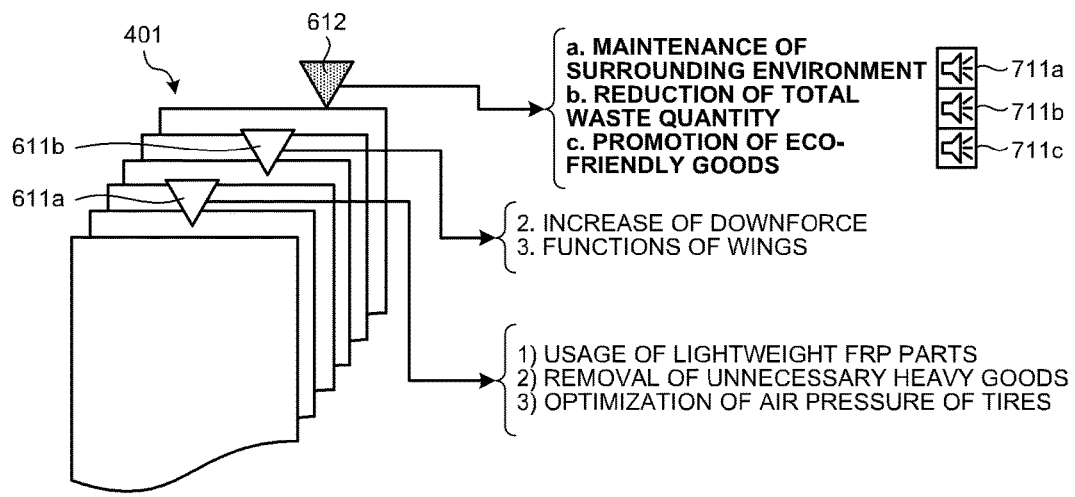
FIG. 10 is a diagram illustrating another example of presentation of a difference with respect to an extracted text.

FIG. 2 is a diagram illustrating an example of a configuration of functional blocks of the reading-aloud information editing device according to the embodiment. FIG. 3 is a diagram illustrating an example of an input document. FIG. 4 is a diagram illustrating an example of an editing operation for metadata on a text. FIG. 5 is a diagram illustrating an example of a result of morphological analysis on a text. FIG. 6 is a flowchart illustrating an example of a generation process for the condition patterns performed by the reading-aloud information editing device according to the embodiment. FIG. 7 is a diagram illustrating an example of a condition pattern generated according to an abstraction level. FIGS. 8A and 8B are diagrams illustrating an example of a result of extraction of a text suitable for a specific condition pattern. FIG. 9 is a diagram illustrating an example of presentation of a difference with respect to a text extracted according to a combination of condition patterns. FIG. 10 is a diagram illustrating another example of presentation of a difference with respect to a text extracted according to a combination of condition patterns. Configurations and operations of the functional blocks of the reading-aloud information editing device 1 according to the embodiment will be described with reference to FIGS. 2 to 10.

As illustrated in FIG. 2, the reading-aloud information editing device 1 according to the embodiment is configured to include an editor 101 (first editor), an edit region acquirer 102 (acquirer), an analyzer 103, a pattern generator 104 (first generator), a pattern selector 105 (selector), an extraction meta rule generator 106 (second generator), an extractor 107, a difference detector 108 (detector), a difference presenter 109 (output controller), an input unit 110, a storage 111, a display 112, and a speech output unit 113 (output unit).

The editor 101 is a functional unit which edits reading-aloud decoration information (hereinafter, sometimes, referred to as metadata) (reading-aloud information) such as accent, pause, and speed of reading-aloud on a text in a document on the basis of user's manipulation input (hereinafter, sometimes, simply referred to as manipulation input) on the input unit 110.

For example, an example of adding (editing) metadata to a text "1. Decrease of air resistance" in an input document 401 illustrated in FIG. 3 will be described with reference to FIG. 4. First, on the basis of the manipulation input, the editor 101 adds metadata "speed-2" for reading aloud the heading number "1." at a speed lower than a default speed so that the text "1. Decrease of air resistance" is read aloud by using speech synthesizing to make listeners easily understand. Therefore, an effect that reading is performed at a speed lower by two levels than the default speed is added.

Next, on the basis of the manipulation input, the editor 101 adds metadata "speed-1" for reading aloud the text "Decrease of air resistance" at a slightly low speed so that the text gives an impression to the listeners and adds metadata "pitch-1" for reading aloud with slightly discreet intonation without excessive intonation. In addition, on the basis of the manipulation input, the editor 101 adds metadata for inserting a slightly short interval (short pause) after "1." and "Decrease" so that reading-aloud giving stable impression is performed.

The editor 101 performs the editing operation for metadata on the text in the input document 401 like the above-described example of editing operations illustrated in FIG. 4. Such metadata are expressed as general-purpose tag notation for generating synthesized speech, for example, speech synthesis markup language (SSML) and are converted into parameters which can be analyzed by a speech synthesizing engine to be stored. In addition, the input document 401 may be, for example, a document produced by a user using the input unit 110, a document stored in the storage 111, a document received through the network I/F 206 illustrated in FIG. 1, or the like.

The edit region acquirer 102 is a functional unit which acquires an edit content including a text (edit region) of a region added with metadata in the text of the input document 401 and the metadata on the basis of the manipulation input. Herein, the edit content includes information itself of the edit region and the metadata, information as to what position in the input document 401 the edit region exists at, what metadata are added, and the like.

The analyzer 103 is a functional unit which performs analysis on the edit content acquired by the edit region acquirer 102. Specifically, the analyzer 103 performs morphological analysis on the edit region included in the edit content to obtain feature information as a result of the morphological analysis, for example, as illustrated in FIG. 5. The feature information "<number><symbol><noun phrase> (of) <preposition><noun phrase>" illustrated in FIG. 5 is a result obtained by performing the morphological analysis on "1. Decrease of air resistance" in the input document 401. Specifically, the feature information illustrated in FIG. 5 represents that "1. Decrease of air resistance" is configured in the order of numeral, symbol, noun phrase, preposition "of", and noun phrase. As described later, the feature information is used by the pattern generator 104 abstracting the edit region.

In addition, by analyzing the edit content, the analyzer 103 acquires document information indicating what position in the input document 401 the edit region exists at, what characters the input document is configured with, in the case of itemization, what items exist, a structure of a preceding document, a structure of a subsequent document, a structure of an immediately previous text, a structure of an immediately following text, and attributes of the edit region such as character decoration.

The pattern generator 104 is a functional unit which generates one or more condition patterns obtained by abstracting the edit region step by step by using the feature information obtained through the analysis of the analyzer 103. Herein, the condition pattern is an abstracted pattern representing what structure the text of the edit region is configured with, and a text suitable for the pattern differs according to a degree of abstraction (abstraction level)

Herein, the generation process for the condition pattern performed by the pattern generator 104 will be described with reference to FIGS. 6 and 7. In addition, the analysis operation of the analyzer 103 will be described. An example where five condition patterns of Patterns (1) to (5) are generated from the edit region in the order where the abstraction levels are heightened as illustrated in FIG. 7 will be described. In addition, in FIG. 7, the original edit region "1. Decrease of air resistance" is indicated by Pattern (0) for the convenience.

<Step S11>

The analyzer 103 reads the edit region which is a surface notation included in the edit content acquired by the edit region acquirer 102. Next, the process proceeds to step S12.

<Step S12>

The analyzer 103 performs the morphological analysis on the edit region. For example, if the edit region is "1. Decrease of air resistance", the analyzer 103 obtains the feature information as a result of the morphological analysis illustrated in FIG. 5 as described above. Next, the process proceeds to step S13.

<Step S13>

The pattern generator 104 abstracts the edit region by using the feature information as a result of the morphological analysis performed by the analyzer 103 on the basis of an abstraction rule "perform replacement with notation of a specific part of speech"

For example, the pattern generator 104 replaces the noun phrase (including noun) as a specific part of speech in the edit region "1. Decrease of air resistance" illustrated in FIG. 7 with "<noun phrase>". Specifically, the pattern generator 104 replaces noun phrases "Decrease" and "air resistance" in "1. Decrease of air resistance" with "<noun phrase>". As a result, as illustrated in FIG. 7, the pattern generator 104 generates "1. <noun phrase> 'of'<noun phrase>" as Pattern (1). In Pattern (1), the original notations of numeral (number), symbol, and preposition "of" are maintained. Specifically, Pattern (1) is a condition pattern indicating that a portion "<noun phrase>" accepts any noun phrase in any text. Hereinafter, sometimes, the abstraction rule for generating the condition pattern described above is referred to as a "pattern rule". Next, the process proceeds to step S14.

<Step S14>

By using the feature information, the pattern generator 104 further abstracts Pattern (1) on the basis of a pattern rule "replace numeral with <number>, replace symbol with <symbol>, and add '+' after noun phrase in order to indicate acceptance of repetition of noun phrases".

For example, the pattern generator 104 replaces "1" with "<number>", replaces symbol "." with "<symbol>", and adds "+" for accepting repetition notation of noun phrases after "<noun phrase>" in Pattern (1) "1. <noun phrase>" of"<noun phrase>" illustrated in FIG. 7. For example, the rule denotes that a portion in Pattern (1) which is already repeated like "<noun phrase>" is also replaced with "<noun phrase>+". As a result, as illustrated in FIG. 7, the pattern generator 104 generates Pattern (2) "<number><symbol><noun phrase>+'of'<noun phrase>+". In Pattern (2), only the preposition "of" is maintained as the original notation. In other words, Pattern (2) is a condition pattern indicating that a portion "<number>" accepts a text of numeral, a portion "<symbol>" accepts a text representing symbol, and a portion "<noun phrase>+" accepts a repetition notation of noun phrases.

Next, by using the feature information, the pattern generator 104 further abstracts Pattern (2) on the basis of a pattern rule "replace preposition with <preposition> and adds '+' after '<preposition><noun phrase>' in order to indicate acceptance of repetition of a combination of preposition and noun phrase".

For example, the pattern generator 104 replaces "of" with "<preposition>" and adds "+" after "<preposition><noun phrase>" in order to accept repetition of a combination of preposition and noun phrase in Pattern (2) "<number><symbol><noun phrase>+'of'<noun phrase>+" illustrated in FIG. 7. As a result, as illustrated in FIG. 7, the pattern generator 104 generates Pattern (3) "<number><symbol><noun phrase>+(<preposition><noun phrase>)+". Specifically, Pattern (3) is a condition pattern indicating that a portion "<number>" accepts a text of numeral, a portion "<symbol>" accepts a text representing symbol, a portion "<noun phrase>+" accepts a repetition notation of noun phrases, and a portion "(<preposition><noun phrase>)+" accepts a repetition notation of a combination of preposition and noun phrase. Next, the process proceeds to step S15.

<Step S15>

The pattern generator 104 further abstracts Pattern (3) on the basis of a pattern rule "replace a specific notation such as <number> with <counter> and insert space in order to indicate acceptance of existence of space after <symbol>".

For example, the pattern generator 104 replaces a specific notation <number> with upper-leveled <counter> and inserts space in order to indicate acceptance of existence of space after <symbol> in Pattern (3) "<number><symbol><noun phrase>+(<preposition><noun phrase>)+" illustrated in FIG. 7. As a result, as illustrated in FIG. 7, the pattern generator 104 generates Pattern (4) "<counter><symbol><noun phrase>+(<preposition><noun phrase>)+". Specifically, Pattern (4) is a condition pattern indicating that a portion "<counter>" accepts numerals, ordered character strings of, for example, alphabets "a, b, c, . . . ", "Japanese Hiragana", "Japanese Katakana", or the like and a portion of space accepts existence of space after "<symbol>". Next, the process proceeds to step S16.

<Step S16>

The pattern generator 104 further abstracts Pattern (4) on the basis of a pattern rule "replace a notation <noun phrase> other than the above-described specific notation with <*>".

For example, the pattern generator 104 replaces a notation <noun phrase> other than a specific notation with <*> in Pattern (4) "<counter><symbol><noun phrase>+(<preposition><noun phrase>)+" illustrated in FIG. 7. As a result, as illustrated in FIG. 7, the pattern generator 104 generates Pattern (5) "<counter><symbol><*>+(<preposition><*>)+". Pattern (5) may be a condition pattern indicating that, for example, a portion "<*>" accepts not only noun phrase but also other parts of speech. Next, the process proceeds to step S17.

<Step S17>

The pattern generator 104 checks whether there exists a notation which can be further abstracted in a condition pattern (Pattern (5) in the example of FIG. 7) generated in step S16. In a case where there exists a notation which can be abstracted (Yes in step S17), the process returns to step S14. In a case where there does not exist any notation which can be abstracted (No in step S17), the generation process for the condition patterns is ended.

Like the flowchart (particularly, steps S13 to S17) illustrated in FIG. 6 described above, the generation process for the condition patterns is performed by the pattern generator 104, so that the condition Patterns (five steps of condition patterns in the example of FIG. 7) of which abstraction levels are heightened step by step are generated. In this manner, since a plurality of the condition patterns of which abstraction levels are heightened step by step are generated, in general, the texts suitable for the respective condition patterns are increased as the abstraction levels of the condition patterns are heightened.

In addition, as the condition patterns generated by the pattern generator 104, the condition patterns illustrated in FIG. 7 are exemplary, and a different number of the condition patterns may be generated on the basis of other pattern rules. In addition, the present embodiment is not limited to a plurality of the condition patterns generated by the pattern generator 104, but one condition pattern may be used. In addition, the pattern rule for generating the condition patterns illustrated in FIG. 7 is exemplary, and for example, a pattern rule may be edited by user's manipulation input through the input unit 110. For example, how to abstract the edit region or the condition pattern, the number of steps of abstraction, or the like may be edited. In this case, for example, the editor 101 (an example of a second editor) may edit the pattern rule by user's manipulation input through the input unit 110.

The pattern selector 105 is a functional unit which selects one or more condition pattern among the condition patterns generated by the pattern generator 104 on the basis of the manipulation input. In this case, for example, the pattern generator 104 allows the display 112 to display a plurality of the generated condition patterns, and a user checks the condition patterns displayed on the display 112 to perform selection manipulation of one or more condition patterns among the displayed condition patterns through the input unit 110.

In addition, as the application range of the selected condition patterns, on the basis of the manipulation input the pattern selector 105 may designate row numbers or a row range in the input document 401, a first half or a second half in the entire input document 401, or a first half, a second half, a start portion, an end portion, or the like in page units constituting the input document 401. Alternatively, the pattern selector 105 may designate an application range of the selected condition patterns on the basis of document structure information which is provided to the input document 401 in advance or is intrinsic to the input document 401. For example, in a case where the input document 401 is written in extensible markup language (XML), extensible hypertext markup language (XHTML), or the like, the pattern selector 105 may designate an application range of the selected condition patterns on the basis of a range designation method according to XML path language (XPath) or the like.

In addition, on the basis of the manipulation input, the pattern selector 105 may select the condition patterns and, for example, may select an application range of the extraction process performed by the extractor 107 in the input document 401. For example, the pattern selector 105 may select a page range or the like which is to be an object of the extraction process in the input document 401 on the basis of the manipulation input.

The extraction meta rule generator 106 is a functional unit which generates an extraction meta rule which is an extraction condition for extracting a text from the input document 401 and including one or more condition patterns selected by the pattern selector 105. In addition, in a case where the application range of the extraction process of the extractor 107 is selected by the pattern selector 105, the application range may be included as an extraction condition in the extraction meta rule.

The extractor 107 is a functional unit which extracts a text suitable for the extraction meta rule generated by the extraction meta rule generator 106 from the input document 401. For example, in a case where the extraction meta rule is configured with Pattern (3) in the condition pattern illustrated in FIG. 7, for example, the extractor 107 extracts the text suitable for Pattern (3) like the extraction notation 501 illustrated in FIG. 8A from the input document. Specifically, the respective texts indicated in the extraction notation 501 are texts including closing bracket symbols following itemized written numbers (numerals) and indicate that the texts are accepted by Pattern (3). In addition, in a case where the extraction meta rule is configured with Pattern (4) in the condition pattern illustrated in FIG. 7, for example, the extractor 107 extracts the text suitable for Pattern (4) like the extraction notation 502 illustrated in FIG. 8B from the input document. Specifically, the respective texts indicated in the extraction notation 502 are texts including symbol "." following the ordered character strings (counter) "a" to "c" and indicate that the texts are accepted by Pattern (4).

In addition, the extractor 107 also extracts position information indicating what position in the input document 401 the extracted text exists at.

The difference detector 108 is a functional unit which detects a difference indicating by what condition pattern included in the extraction meta rule the text is extracted in the text extracted according to the extraction meta rule by the extractor 107.

The difference presenter 109 is a functional unit which allows the display 112 to display at what position in the input document 401 what text suitable for what condition pattern is extracted on the basis of the text and position information extracted by the extractor 107 and the information of the difference detected by the difference detector 108.

For example, a display example illustrated in FIG. 9 is an example illustrating texts extracted from the input document 401 by the extractor 107 by using a combination of Pattern (2) and Pattern (3) illustrated in FIG. 7 as an extraction meta rule. The extractor 107 extracts, as the texts suitable for Pattern (2), "2. Increase of downforce", "3. Functions of wings", "1) Usage of lightweight FRP parts", and "2) Removal of unnecessary heavy goods" from the input document 401. In addition, the extractor 107 extracts, as the text suitable for Pattern (3) "3) Optimization of air pressure of tires" from the input document 401. Since Pattern (3) is a condition pattern obtained by further abstracting Pattern (2) as described above, the above-described "2. Increase of downforce", "3. Functions of wings", "1) Usage of lightweight FRP parts", and "2) Removal of unnecessary heavy goods" are suitable for Pattern (2) and are also suitable for Pattern (3). In FIG. 9 (and FIG. 10 described below), the text suitable for the condition pattern of which the abstraction level is low is displayed so as to be preferentially indicated.

Next, the difference detector 108 detects a difference that, among the texts extracted by the extractor 107, "2. Increase of downforce", "3. Functions of wings", "1) Usage of lightweight FRP parts", and "2) Removal of unnecessary heavy goods" are the texts suitable for Pattern (2), and "3) Optimization of air pressure of tires" is the text suitable for Pattern (3). As illustrated in FIG. 9, the difference presenter 109 displays the text suitable for Pattern (3) in bolder than the text suitable for Pattern (2) to clarify the difference therebetween. In addition, the method of distinguishably displaying texts suitable for different condition patterns is not limited to the method of changing the thickness of characters of the text as illustrated in FIG. 9, but for example, the texts may be displayed so as to be distinguishable visually according to the size, color, hatching, highlight, or the like of the texts.

As illustrated in FIG. 9, by using the position information extracted by the extractor 107, the difference presenter 109 allows the pointer 601*a* to indicate that "1) Usage of lightweight FRP parts" and "2) Removal of unnecessary heavy goods" are extracted from the first page of the input document 401. In addition, the difference presenter 109 allows the pointer 601*b* to indicate that "2. Increase of downforce" and "3. Functions of wings" are extracted from the third page of the input document 401. In addition, the difference presenter 109 allows the pointer 602 to indicate that "3) Optimization of air pressure of tires" is extracted from the first page of the input document 401.

In addition, the difference presenter 109 displays a speech playing icon 701 for outputting read-aloud speech in the vicinity of the text suitable for Pattern (3) "3) Optimization of air pressure of tires". When the speech playing icon 701 is pushed according to the manipulation input, the difference presenter 109 allows the speech output unit 113 to output the read-aloud speech in a case where the metadata such as metadata added to the original edit region are applied to "3) Optimization of air pressure of tires". In addition, in the example illustrated in FIG. 9, the speech playing icon is arranged in the vicinity of "3) Optimization of air pressure of tires". However, the present embodiment is not limited thereto, but for example, the speech playing icon may be arranged in the vicinity of the text suitable for Pattern (2), or the speech playing icons may be arranged in the vicinity of all the extracted texts.

In addition, a display example illustrated in FIG. 10 is an example illustrating texts extracted from the input document 401 by the extractor 107 by using a combination of Pattern (3) and Pattern (4) illustrated in FIG. 7 as an extraction meta rule. The extractor 107 extracts, as texts suitable for Pattern (3), "2. Increase of downforce", "3. Functions of wings", "1) Usage of lightweight FRP parts", "2) Removal of unnecessary heavy goods", and "3) Optimization of air pressure of tires" from the input document 401. In addition, the extractor 107 extracts, as text suitable for Pattern (4), "a. Maintenance of surrounding environment", "b. Reduction of total waste quantity", and "c. Promotion of eco-friendly goods" from the input document 401. Since Pattern (4) is a condition pattern obtained by further abstracting Pattern (3) as described above, the above-described "2. Increase of downforce", "3. Functions of wings", "1) Usage of lightweight FRP parts", "2) Removal of unnecessary heavy goods", and "3) Optimization of air pressure of tires" are suitable for Pattern (3) and are also suitable for Pattern (4). In FIG. 10, similarly to FIG. 9, the text suitable for the condition pattern of which the abstraction level is low is displayed so as to be preferentially indicated.

Next, the difference detector 108 detects a difference that, among the texts extracted by the extractor 107, "2. Increase of downforce", "3. Functions of wings", "1) Usage of lightweight FRP parts", "2) Removal of unnecessary heavy goods", and "3) Optimization of air pressure of tires" are the texts suitable for Pattern (3) and "a. Maintenance of surrounding environment", "b. Reduction of total waste quantity", and "c. Promotion of eco-friendly goods" are the texts suitable for Pattern (4). As illustrated in FIG. 10, for example, the difference presenter 109 displays the text suitable for Pattern (4) in bolder than the text suitable for Pattern (3) to clarify the difference therebetween.

As illustrated in FIG. 10, by using the position information extracted by the extractor 107, the difference presenter 109 allows the pointer 611*a* to indicate that "1) Usage of lightweight FRP parts", "2) Removal of unnecessary heavy goods", and "3) Optimization of air pressure of tires" are extracted from the first page of the input document 401. In addition, the difference presenter 109 allows the pointer 611*b* to indicate that "2. Increase of downforce" and "3. Functions of wings" are extracted from the third page of the input document 401. In addition, the difference presenter 109 allows the pointer 612 to indicate that "a. Maintenance of surrounding environment", "b. Reduction of total waste quantity", and "c. Promotion of eco-friendly goods" are extracted from the sixth page of the input document 401.

In addition, the difference presenter 109 displays speech playing icons 711*a* to 711*c* for outputting read-aloud speech in the vicinity of the texts suitable for Pattern (4) "a. Maintenance of surrounding environment", "b. Reduction of total waste quantity", and "c. Promotion of eco-friendly goods", respectively. For example, when the speech playing icon 711*b* is pushed according to the manipulation input, the difference presenter 109 allows the speech output unit 113 to output the read-aloud speech in a case where the metadata such as metadata added to the original edit region are applied to "b. Reduction of total waste quantity".

Next, the user may check the contents which are illustrated in FIGS. 9 and 10 described above and are displayed by the difference presenter 109 to check the read-aloud speech output from the speech output unit 113, and the metadata of the edit region may be edited by the manipulation input on the input unit 110 and the editor 101. In addition, the text of which the metadata can be edited is not limited to only the edit region, but for example, the metadata with respect to each of the extracted texts may be edited.

Next, the user checks the application range of the metadata of the edit region from the display by the difference presenter 109 and, after that, allows the difference presenter 109 to add the metadata such as the metadata of the edit region to the extracted text by the manipulation input.

The input unit 110 is a functional unit which receives manipulation input from a user. The input unit 110 is implemented by the manipulation device 207 illustrated in FIG. 1

The storage 111 is a functional unit which stores the input document, the metadata, the speech data, and other various data and programs. The storage 111 is implemented by the auxiliary storage device 204 illustrated in FIG. 1.

The display 112 is a functional unit which displays a screen or the like of application executed by the CPU 201. For example, the display 112 displays the condition pattern generated by the pattern generator 104 illustrated in FIG. 7 or results of the function of the difference presenter 109 illustrated in FIGS. 9 and 10. The display 112 is implemented by the display device 205 illustrated in FIG. 1.

The speech output unit 113 is a functional unit which outputs speech, for example, on the basis of instruction of the difference presenter 109. For example, the speech output unit 113 outputs read-aloud speech in a case where the metadata like the metadata added to the edit region is applied to the text extracted by the extractor 107. The speech output unit 113 is implemented by the speaker 210 illustrated in FIG. 1.

The editor 101, the edit region acquirer 102, the analyzer 103, the pattern generator 104, the pattern selector 105, the extraction meta rule generator 106, the extractor 107, the difference detector 108, and the difference presenter 109 described above are implemented by the CPU 201 illustrated in FIG. 1 reading out the program stored in the auxiliary storage device 204 or the like to the RAM 203 and executing the program. In addition, all the editor 101, the edit region acquirer 102, the analyzer 103, the pattern generator 104, the pattern selector 105, the extraction meta rule generator 106, the extractor 107, the difference detector 108, and the difference presenter 109 are not limited to being implemented by execution of the program, but at least a portion may be implemented by a hardware circuit of ASIC (Application Specific Integrated Circuit), FPGA (Field-Programmable Gate Array), or the like.

In addition, the configuration of the functional blocks illustrated in FIG. 2 indicates functions in a conceptual manner, and the present invention is not limited to the configuration. For example, a plurality of functional units illustrated as independent functional units in FIG. 2 may be configured as one functional unit. On the other hand, a function of one functional unit of FIG. 2 may be divided into a plurality of functions and may be configured as a plurality of functional units.

FIG. 11 is a feature information an example of overall operations of the reading-aloud information editing device according to the embodiment. The flow of the overall operations of the reading-aloud information editing device 1 according to the embodiment will be comprehensively described with reference to FIG. 11.

<Step S21>
The editor 101 edits metadata as reading-aloud decoration information such as accent, pause, and speed of reading-aloud on a text in an input document (for example, the input document 401 illustrated in FIG. 3) on the basis of user's manipulation input on the input unit 110. Next, the process proceeds to step S22.

<Step S22>
The edit region acquirer 102 acquires an edit content including a text (edit region) of a region added with metadata in the text of the input document and the metadata on the basis of the manipulation input. Next, the process proceeds to step S23.

<Step S23>
The analyzer 103 performs analysis on the edit content acquired by the edit region acquirer 102. Specifically, the analyzer 103 performs morphological analysis on the edit region included in the edit content to obtain feature information as a result of the morphological analysis, for example, as illustrated in FIG. 5. Next, the process proceeds to step S24.

<Step S24>
The pattern generator 104 generates condition patterns obtained by abstracting the edit region step by step by using the feature information obtained through the analysis of the analyzer 103. For example, the pattern generator 104 generates five condition patterns of Patterns (1) to (5) from the edit region in the order where the abstraction levels are heightened as illustrated in FIG. 7. A specific example of the generation process for the condition patterns performed by the pattern generator 104 is the same as the above-described flowchart (steps S13 to S17) illustrated in FIG. 6. Next, the process proceeds to step S25.

<Step S25>
The pattern selector 105 selects at least one or more condition patterns among the condition patterns generated by the pattern generator 104 on the basis of the manipulation input. Next, the process proceeds to step S26.

<Step S26>
The extraction meta rule generator 106 generates an extraction meta rule which is at least one or more condition patterns selected by the pattern selector 105 and the extraction condition for extracting a text from the input document. Next, the process proceeds to step S27.

<Step S27>
The extractor 107 extracts a text suitable for the extraction meta rule generated by the extraction meta rule generator 106 from the input document. Next, the process proceeds to step S28.

<Step S28>
The difference detector 108 detects a difference indicating by what condition pattern included in the extraction meta rule the text is extracted in the text extracted according to the extraction meta rule by the extractor 107. Next, the process proceeds to step S29.

<Step S29>
The difference presenter 109 allows the display 112 to display (present) at what position in the input document what text suitable for what condition pattern is extracted on the basis of the text and position information extracted by the extractor 107 and the difference information detected by the difference detector 108. A specific display (presentation) example is the same as described in FIGS. 9 and 10.

The overall operations of the reading-aloud information editing device 1 are performed as illustrated in the flowchart illustrated in FIG. 11 heretofore.

As described above, the reading-aloud information editing device 1 according to the embodiment performs the morphological analysis on the edit region added with the reading-aloud decoration information (metadata) of synthesized speech in the text of the document and generates one or more condition patterns by abstracting the edit region step by step by using a result of the morphological analysis. Next, the text suitable for the extraction meta rule including one or more condition patterns is extracted, namely, the text having a document structure (a degree of similarity is based on the abstraction level of the condition pattern) similar to that of the edit region is extracted, so that the metadata such as the metadata added to the edit region may be applied to the extracted text. In general, in order to add decoration information for reading out through speech synthesis to a text, there is a dedicated notation, and a considerable skill is required to master the notation. In addition, with respect to compound words and phrases, knowledge about division and combination of accent phrases is also needed, and in some case, intuitively specifying reading and accents may be difficult. However, since the reading-aloud information editing device 1 is configured as described above, it is possible to easily recognize the influence range in a case where the metadata such as the metadata applied to the edit region are applied, and the metadata such as the metadata of the edit region may be collectively applied to the text in the influence range, namely, the text extracted on the basis of the extraction meta. Since the same metadata can be applied to texts having the same sentence structure as the edit region at once, it is possible to reduce the number of steps of editing metadata, and it is possible to suppress overlooking of edit.

Although the reading-aloud information editing device 1 is configured as one stand-alone device as illustrated in FIGS. 1 and 2, the present invention is not limited thereto. For example, the reading-aloud information editing device may be implemented as a client server system where, among the functional units illustrated in FIG. 2, the editor 101, the edit region acquirer 102, the analyzer 103, the pattern generator 104, the pattern selector 105, the extraction meta rule generator 106, the extractor 107, the difference detector 108, the difference presenter 109, and the storage 111 may be included in a server device, and the input unit 110, the display 112, and the speech output unit 113 may be included in a client device.

In addition, the program executed by the reading-aloud information editing device 1 according to the above-described embodiment may be embedded in ROM or the like in advance to be provided.

In addition, the program executed by the reading-aloud information editing device 1 according to the above-described embodiment may be configured so as to be recorded as a file in an installable format or an executable format on a computer-readable recording medium such as a CD-ROM, a flexible disk (FD), a CD-R, or a DVD and to be provided as a computer program product.

In addition, the program executed by the reading-aloud information editing device 1 according to the above-described embodiment may be configured so as to be stored on a computer connected to a network such as the Internet and to be downloaded via the network to be provided. In addition, the program executed by the reading-aloud information editing device 1 according to the above-described embodiment may be configured so as to be provided or distributed via a network such as the Internet.

In addition, the program executed by the reading-aloud information editing device 1 according to the above-described embodiment allows a computer to function as each of the above-described functional units. In the computer, the CPU may read a program from a computer-readable storage medium onto a main storage device to execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading-aloud information editing device comprising:
   an acquirer, implemented by a hardware processor, configured to acquire an edit region comprising a first text associated with reading-aloud information from a document;
   an analyzer, implemented by the hardware processor, configured to analyze a document structure of the edit region;
   a first generator, implemented by the hardware processor, configured to generate a plurality of condition patterns by abstracting the edit region step by step based at least in part on the document structure, each of the condition patterns being a pattern that is generated by abstracting the document structure of the first text of the edit region in accordance with a degree of abstraction;
   a second generator, implemented by the hardware processor, configured to generate an extraction condition for extracting at least one second text from the document, the extraction condition comprising at least two of the condition patterns;
   an extractor, implemented by the hardware processor, configured to extract the at least one second text suitable for the extraction condition from the document;
   a detector, implemented by the hardware processor, configured to detect a difference between the condition patterns suitable for the at least one second text; and
   an output controller, implemented by the hardware processor, configured to allow a display device to output the at least one second text extracted by the extractor so that the difference is clearly displayed.

2. The device according to claim 1, further comprising a first editor, implemented by the hardware processor, configured to edit the reading-aloud information of the document.

3. The device according to claim 1, wherein the output controller allows the display device to output the texts based at least in part on the difference so that the texts extracted according to the different condition patterns by the extractor are visually different.

4. The device according to claim 1, wherein
   the acquirer is further configured to acquire the reading-aloud information added to the edit region, and
   the output controller allows a speech output device to output read-aloud speech in a case where the reading-aloud information of the edit region is applied to at least one of the texts extracted by the extractor.

5. The device according to claim 1, wherein the condition patterns are abstracted patterns indicating the document structure of the first text of the edit region.

6. The device according to claim 1, further comprising
   a selector, implemented by the hardware processor, configured to select the at least two condition patterns from the plurality of the condition patterns generated by the first generator, wherein
   the second generator generates the extraction condition comprising the condition patterns selected by the selector.

7. The device according to claim 1, wherein the first generator generates the condition patterns based on at least one of:
   abstraction of serial number symbols or numbers included in the edit region as counter elements as a same type,
   abstraction of a text of a same part of speech as that of the edit region as the same type, and
   abstraction of accepting repetition of one or more types of parts of speech in the edit region.

8. The device according to claim 1, further comprising a second editor, implemented by the hardware processor, configured to edit a pattern rule as a rule for abstracting the edit region, wherein the first generator generates the condition patterns by abstracting the edit region according to the pattern rule.

9. A reading-aloud information editing method comprising:
   acquiring an edit region comprising a first text associated with reading-aloud information from a document;

analyzing a document structure of the edit region;

generating a plurality of condition patterns by abstracting the edit region step by step based at least in part on the document structure, each of the condition patterns being a pattern that is generated by abstracting the document structure of the first text of the edit region in accordance with a degree of abstraction;

generating an extraction condition for extracting at least one second text from the document, the extraction condition comprising at least two of the condition patterns;

extracting the at least one second text suitable for the extraction condition from the document;

detecting a difference between the condition patterns suitable for the at least one second text; and outputting on a display device the at least one second text extracted so that the difference is clearly displayed.

10. A computer program product comprising a non-transitory computer-readable medium containing a program, wherein the program, when executed by a computer, causes the computer to execute:

acquiring an edit region comprising a first text associated with reading-aloud information from a document;

analyzing a document structure of the edit region;

generating a plurality of condition patterns by abstracting the edit region step by step based at least in part on the document structure, each of the condition patterns being a pattern that is generated by abstracting the document structure of the first text of the edit region in accordance with a degree of abstraction;

generating an extraction condition for extracting at least one second text from the document, the extraction condition comprising at least two of the condition patterns;

extracting the at least one second text suitable for the extraction condition from the document;

detecting a difference between the condition patterns suitable for the at least one second text; and outputting on a display device the at least one second text extracted so that the difference is clearly displayed.

\* \* \* \* \*